US012251803B1

(12) United States Patent
Gong

(10) Patent No.: US 12,251,803 B1
(45) Date of Patent: Mar. 18, 2025

(54) SNAP SPRING DISMOUNTING AND MOUNTING TOOL

(71) Applicant: Jie Gong, Changde (CN)

(72) Inventor: Jie Gong, Changde (CN)

( * ) Notice: Subject to any disclaimer, the term of this patent is extended or adjusted under 35 U.S.C. 154(b) by 0 days.

(21) Appl. No.: 18/953,471

(22) Filed: Nov. 20, 2024

(30) Foreign Application Priority Data

Oct. 31, 2024 (CN) ......................... 202422653917.3

(51) Int. Cl.
*B25B 27/20* (2006.01)
*B25B 9/00* (2006.01)
*B25B 27/00* (2006.01)

(52) U.S. Cl.
CPC ........ *B25B 27/205* (2013.01); *B25B 27/0028* (2013.01); *B25B 9/00* (2013.01)

(58) Field of Classification Search
CPC ... B25B 27/0028; B25B 27/20; B25B 27/205; B25B 5/16; B25B 5/163; B25B 7/02; B25B 7/04; B25B 9/00; B25B 9/02; Y10T 29/5363
See application file for complete search history.

(56) References Cited

U.S. PATENT DOCUMENTS 4,689,865 A * 9/1987 Chamblee ............. B25B 27/205 29/229
6,125,517 A * 10/2000 Yu ........................... B25B 27/20 29/229

FOREIGN PATENT DOCUMENTS

CN 208584496 U 3/2019
CN 211639760 U 10/2020
CN 218017978 U 12/2022

* cited by examiner

*Primary Examiner* — Tyrone V Hall, Jr.
(74) *Attorney, Agent, or Firm* — Nitin Kaushik

(57) ABSTRACT

The present invention discloses a snap spring dismounting and mounting tool, including: an outer housing; a dismounting and mounting assembly, two ends of which can be detachably clamped in the outer housing, respectively; a pressing rod, which is movably disposed on the outer housing and can be in contact connection with or disengaged from the dismounting and mounting assembly; and an elastic member, which is disposed in the outer housing, is in contact connection with the pressing rod, and provides a biasing force and a restoring force to the pressing rod, respectively, where the dismounting and mounting assembly includes a connecting mechanism, and a first clamping plier body and a second clamping plier body that are movably disposed on the connecting mechanism relative to each other; the first clamping plier body and the second clamping plier body have a gap disposed therebetween.

14 Claims, 6 Drawing Sheets

SNAP SPRING DISMOUNTING AND MOUNTING TOOL

CROSS-REFERENCE TO RELATED APPLICATIONS

The application claims priority to Chinese patent application No. 2024226539173, filed on Oct. 31, 2024, the entire contents of which are incorporated herein by reference.

TECHNICAL FIELD

The present invention relates to the technical field of dismounting and mounting tools, and specifically, in particular to a snap spring dismounting and mounting tool.

BACKGROUND

A snap spring is mounted as a fastener in a shaft groove or a hole groove of a machine or equipment, for preventing axial movement of parts on a shaft or a hole. The snap spring is widely applied, and its main dismounting and mounting principle is as follows: the snap spring is subjected to appropriate deformation by using a tool; when the deformation reaches a size to detach from the groove, the snap spring can be dismounted; and when the deformation reaches the size requirements of a mounting site, the snap spring is released to restore an original shape, thereby achieving the purpose of mounting and fastening. According to an E-type snap spring dismounting and mounting tool in the prior art, dismounting and mounting heads thereof are generally fixedly connected, which can only dismount and mount standard E-type snap springs. However, due to certain tolerances in the sizes of some E-type snap springs, these springs are mismatched with the dismounting and mounting heads of the dismounting and mounting tool, and thus the E-type snap springs with tolerances cannot be dismounted and mounted easily. Therefore, a snap spring dismounting and mounting tool is provided for solving the above problem.

SUMMARY

One of the objectives of the present invention is to provide a snap spring dismounting and mounting tool, so as to solve a problem that E-type snap springs with tolerances cannot be dismounted and mounted easily by an existing dismounting and mounting tool.

A snap spring dismounting and mounting tool provided by the present invention can be implemented through the following technical solutions:

A snap spring dismounting and mounting tool provided by the present invention includes: an outer housing, which is a hollow cavity; a dismounting and mounting assembly, two ends of which can be detachably clamped in the outer housing, respectively; a pressing rod, which is movably disposed on the outer housing and can be in contact connection with or disengaged from the dismounting and mounting assembly; and an elastic member, which is disposed in the outer housing, is in contact connection with the pressing rod, and provides a biasing force and a restoring force to the pressing rod, respectively, where the dismounting and mounting assembly includes a connecting mechanism, and a first clamping plier body and a second clamping plier body that are movably disposed on the connecting mechanism relative to each other; the first clamping plier body and the second clamping plier body have a gap disposed therebetween, and can be in contact connection with or disengaged from the pressing rod, respectively; and when the pressing rod is in contact connection with the first clamping plier body or the second clamping plier body, the pressing rod provides a biasing force to the first clamping plier body or the second clamping plier body, allowing the first clamping plier body and the second clamping plier body to perform biased movement relative to each other.

In an embodiment, two opposite ends of the first clamping plier body are provided with a first mounting head and a first dismounting head, respectively; two opposite ends of the second clamping plier body are provided with a second mounting head and a second dismounting head, respectively; the first mounting head and the second mounting head are disposed opposite to each other, and a snap spring is clamped and mounted through cooperation of the first mounting head and the second mounting head; and the first dismounting head and the second dismounting head are disposed opposite to each other, and the snap spring is clamped and detached through cooperation of the first dismounting head and the second dismounting head.

In an embodiment, two limiting grooves are symmetrically disposed in the outer housing, and the two ends of the dismounting and mounting assembly are detachably disposed in corresponding limiting grooves, respectively.

In an embodiment, a mounting groove is disposed on a side edge of the outer housing, and the pressing rod is rotatably disposed in the mounting groove by means of a plug pin.

In an embodiment, a first through hole is further formed in the outer housing in a penetrating manner, and the plug pin is disposed on the outer housing through the first through hole.

In an embodiment, a clamping groove is formed in a side edge, corresponding to the pressing rod, of each of the first clamping plier body and the second clamping plier body, respectively, and one end of the pressing rod is disposed in the clamping groove in a press fit manner.

In an embodiment, the pressing rod includes a pressing rod main body which is a streamlined rod body and is movably disposed in the mounting groove through the plug pin; and a compacting head and a pressing head which are disposed on two opposite ends of the pressing rod main body, respectively, where the compacting head is detachably disposed in the clamping groove.

In an embodiment, a height of the pressing head is greater than that of a horizontal plane of the mounting groove, and the elastic member is disposed below the pressing head.

In an embodiment, the pressing rod main body, the compacting head, and the pressing head are integrally formed.

In an embodiment, second through holes are formed in the first clamping plier body and the second clamping plier body in a penetrating manner, respectively, and the first clamping plier body and the second clamping plier body are movably disposed on the connecting mechanism through corresponding second through holes.

In an embodiment, the connecting mechanism includes: two connecting plates oppositely disposed at an interval, the first clamping plier body and the second clamping plier body being oppositely disposed between the two connecting plates; and a plurality of connecting pins disposed on the two connecting plates in a penetrating manner, respectively, and the first clamping plier body and the second clamping plier body being rotatably disposed on corresponding connecting pins, respectively.

In an embodiment, the plurality of connecting pins are disposed on the two connecting plates in a riveting manner, respectively.

In an embodiment, a spring is used as the elastic member.

In an embodiment, a connecting hole is formed in the outer housing in a penetrating manner.

Compared to the prior art, a snap spring dismounting and mounting tool provided by the present invention has the following beneficial effects:

According to a snap spring dismounting and mounting tool provided by the present invention, the pressing rod is in contact connection with the first clamping plier body or the second clamping plier body, so as to provide a biasing force to the first clamping plier body or the second clamping plier body, and thus the first clamping plier body and the second clamping plier body perform biased movement relative to each other, and can match each other to clamp an E-type snap spring with a certain tolerance. Further, through mutual cooperation of the dismounting and mounting assembly, the pressing rod, and the clastic member, the clamping mounting operation or clamping detaching operation of the snap spring is achieved, and a problem that existing E-type snap springs with tolerances cannot be dismounted and mounted easily by an existing dismounting and mounting tool is effectively solved. The dismounting and mounting assembly is detachably connected to the outer housing, and two ends of the dismounting and mounting assembly are provided with a mounting head and a dismounting head, respectively, so that the E-type snap spring can be conveniently dismounted and mounted by users using one tool. In addition, the snap spring dismounting and mounting tool has characteristics of simple structure and easy assembly.

BRIEF DESCRIPTION OF THE DRAWINGS

To describe the technical solutions in the embodiments of the present invention more clearly, the following briefly describes the accompanying drawings required for describing the embodiments. It should be understood that, the following accompanying drawings show merely some embodiments of the present invention, and therefore should not be regarded as a limitation on the scope. A person of ordinary skill in the art may still derive other related drawings from these accompanying drawings without creative efforts.

Figure 1:
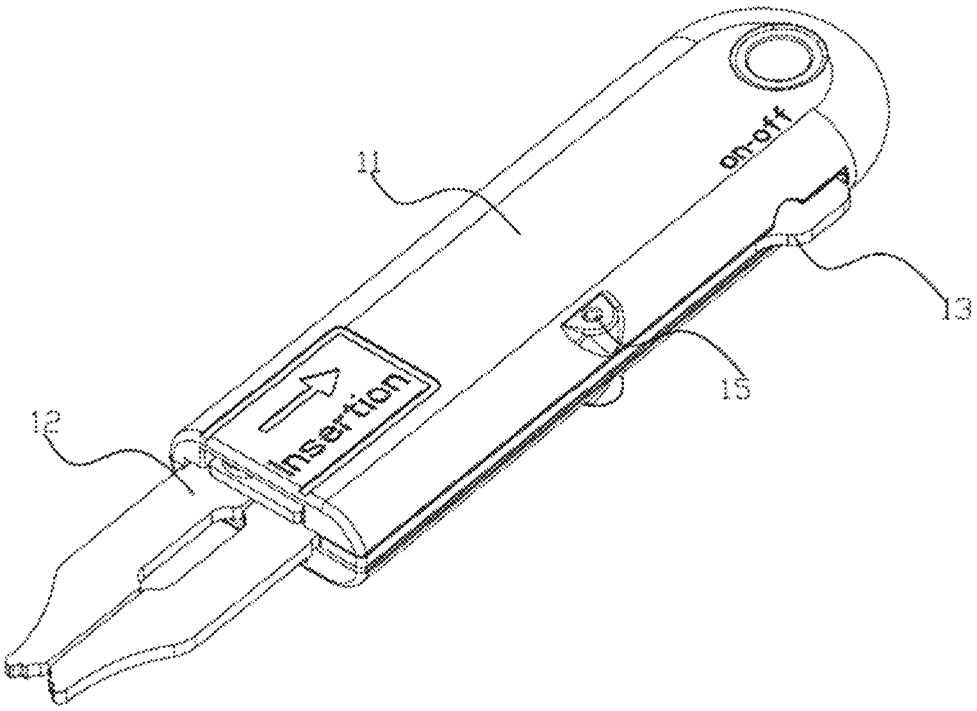
FIG. 1 is a schematic structural diagram of a snap spring dismounting and mounting tool according to the present invention.

Reference numerals in figures: 10, snap spring dismounting and mounting tool; 11, outer housing; 111, limiting groove; 112, mounting groove; 113, first through hole; 114, connecting hole; 12, dismounting and mounting assembly; 121, first clamping plier body; 1211, first mounting head; 1212, first dismounting head; 122, second clamping plier body; 1221, second mounting head; 1222, second dismounting head; 123, connecting mechanism; 1231, connecting plate; 1232, connecting pin; 124, clamping groove; 125, second through hole; 13, pressing rod; 131, pressing rod main body; 1311, plug pin hole; 132, compacting head; 133, pressing head; 14, elastic member; 15, plug pin.

DETAILED DESCRIPTION OF THE EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. Components of the embodiments of the present invention described and illustrated in the accompanying drawings can be arranged and designed in various different configurations.

Therefore, the detailed description of the embodiments of the present invention provided in the accompanying drawings is not intended to limit the scope of the claimed invention, but only to represent selected embodiments of the present invention. Based on the embodiments in the present invention, all other embodiments obtained by those of ordinary skill in the art without making creative labor fall within the scope of protection of the present invention.

Figure 2:
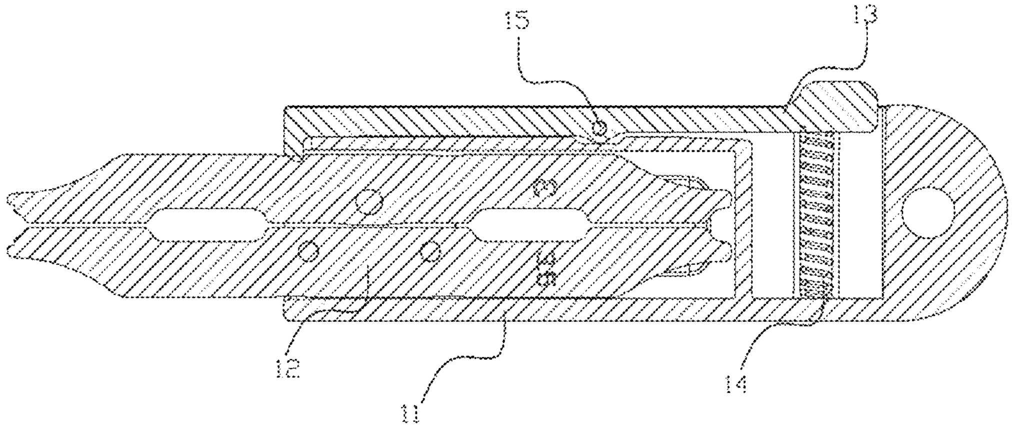
FIG. 2 is a schematic diagram of a cross-sectional structure of a snap spring dismounting and mounting tool according to the present invention shown in FIG. 1.
Figure 3:
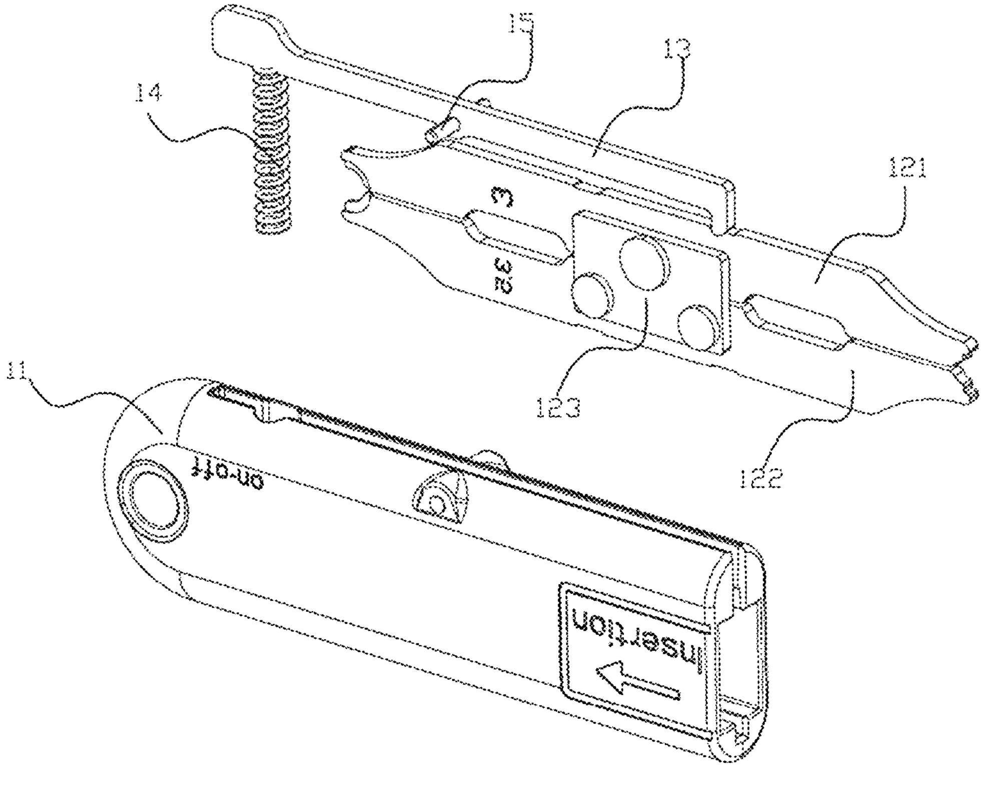
FIG. 3 is a schematic diagram of an explosion structure of a snap spring dismounting and mounting tool according to the present invention shown in FIG. 1, including an outer housing, a dismounting and mounting assembly, and a pressing rod.
Figure 4:
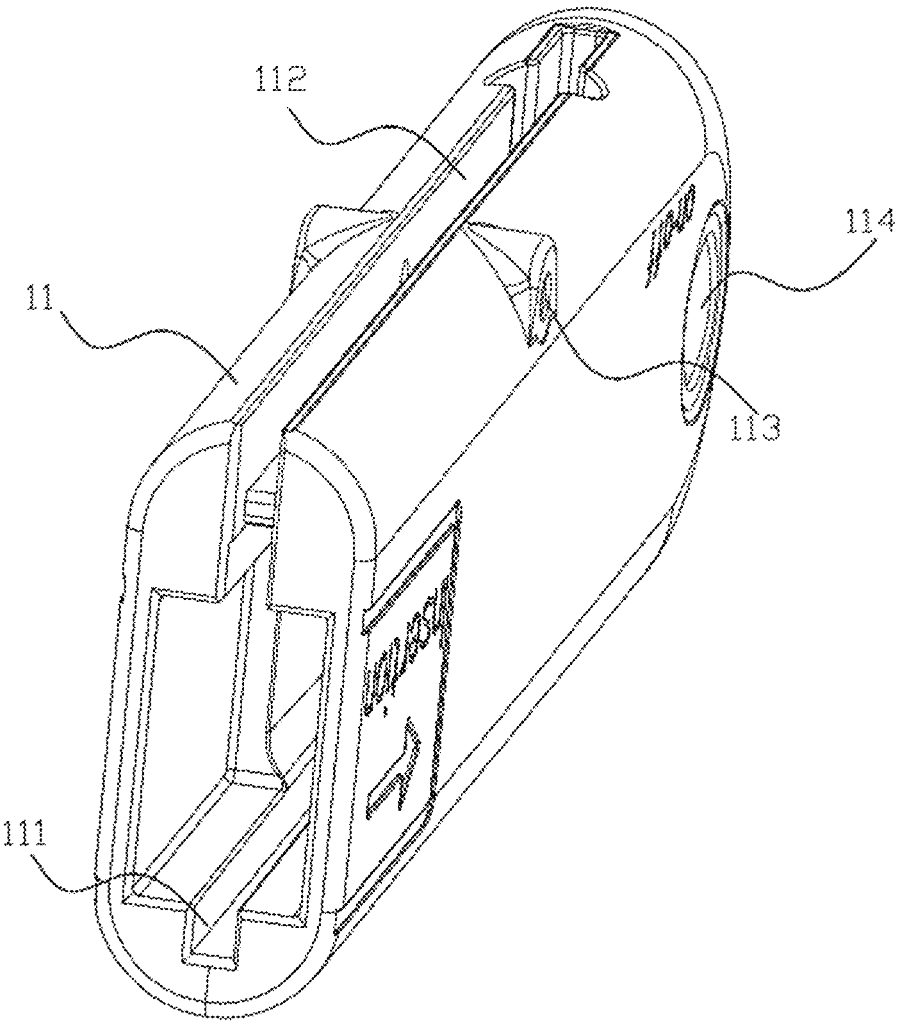
FIG. 4 is a schematic structural diagram of an outer housing shown in FIG. 3.

Referring to FIG. 1 to FIG. 3, a snap spring dismounting and mounting tool 10 provided by the present invention mainly includes an outer housing 11, a dismounting and mounting assembly 12, a pressing rod 13, and an elastic member 14. The outer housing 11 is a hollow cavity, facilitating users to access the snap spring dismounting and mounting tool 10; two ends of the dismounting and mounting assembly 12 are detachably clamped in the outer housing 11, respectively, and have functions of dismounting and mounting a snap spring, respectively. The pressing rod 13 is movably disposed on the outer housing 11 and can be in contact connection with or disengaged from the dismounting and mounting assembly 12, and when the pressing rod 13 is in contact connection with the dismounting and mounting assembly 12, the pressing rod 13 provides a biasing force to the dismounting and mounting assembly 12, allowing the dismounting and mounting assembly 12 to clamp the snap spring. The elastic member 14 is disposed in the outer housing 11, is in contact connection with the pressing rod 13, and provides a biasing force and a restoring force to the pressing rod 13, respectively. The biasing force provided by the elastic member 14 to the pressing rod 13 acts on the dismounting and mounting assembly 12, so that the dismounting and mounting assembly 12 implements clamping mounting and clamping dismounting operations. When an external force acts on the pressing rod 13, the elastic member 14 provides a restoring force to the pressing rod 13, allowing the pressing rod to return to an initial position. Specifically, a spring is used as the elastic member 14.

Referring to FIG. 1 to FIG. 4, specifically, two limiting grooves 111 are symmetrically formed in the outer housing 11, two ends of the dismounting and mounting assembly 12 are detachably disposed in corresponding limiting grooves 111, respectively, and an operation of mounting the dismounting and mounting assembly 12 into the outer housing 11 is limited and guided by the two limiting grooves 111. A mounting groove 112 is further disposed on a side edge of the outer housing 11, the pressing rod 13 is rotatably disposed in the mounting groove 112 through a plug pin 15, one end of the pressing rod 13 is in contact connection with the dismounting and mounting assembly 12, and the other end thereof is in contact connection with the elastic member 14. A first through hole 113 and a connecting hole 114 are also formed in the outer housing 11 in a penetrating manner, respectively. The plug pin 15 is disposed on the outer housing 11 through the first through hole 113, and the outer housing 11 is suspended through the connecting hole 114.

Referring to FIG. 1, FIG. 2, FIG. 3, and FIG. 5, in this embodiment, the dismounting and mounting assembly 12 includes a first clamping plier body 121, a second clamping plier body 122, and a connecting mechanism 123. The first clamping plier body 121 and the second clamping plier body 122 are disposed opposite to each other and have a gap disposed therebetween. The first clamping plier body and the second clamping plier body can be in contact connection with the pressing rod 13, respectively. The pressing rod 13 provides a biasing force to the first clamping plier body 121 or the second clamping plier body 122, allowing the first clamping plier body 121 or the second clamping plier body 122 that is in contact connection with the pressing rod 13 to perform biased movement, and thus the first clamping plier body 121 and the second clamping plier body 122 move towards each other to compact the snap spring. The connecting mechanism 123 is movably disposed on the first clamping plier body 121 and the second clamping plier body 122, respectively, and the first clamping plier body 121 and the second clamping plier body 122 can perform deflection movement on the connection mechanism 123, respectively.

Figure 5:
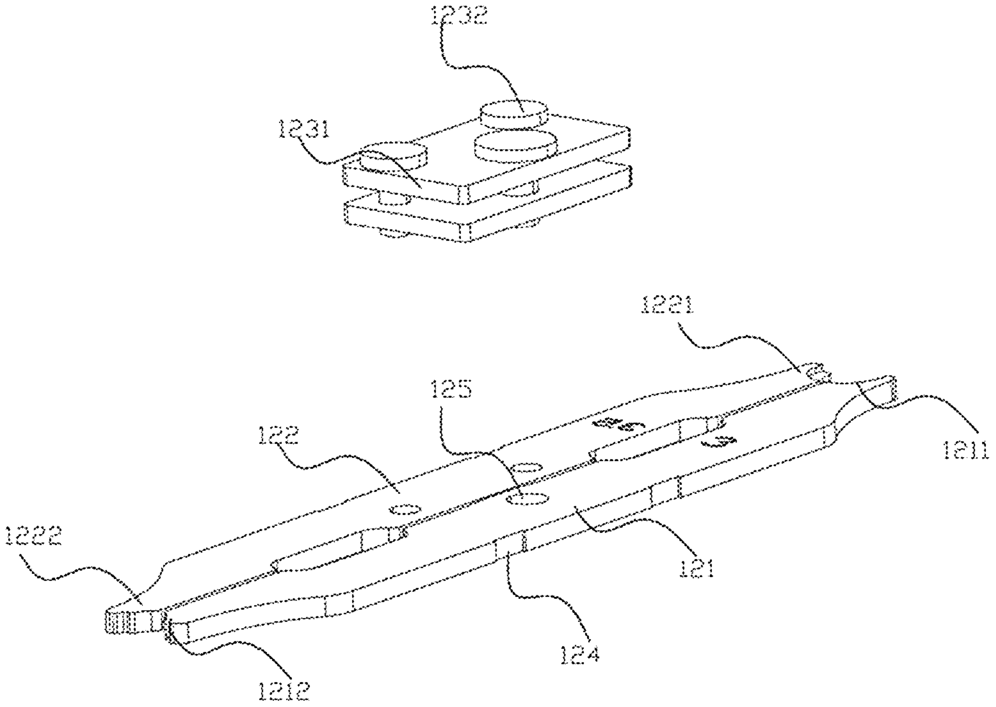
FIG. 5 is a schematic diagram of an explosion structure of a dismounting and mounting assembly shown in FIG. 3.
Figure 6:
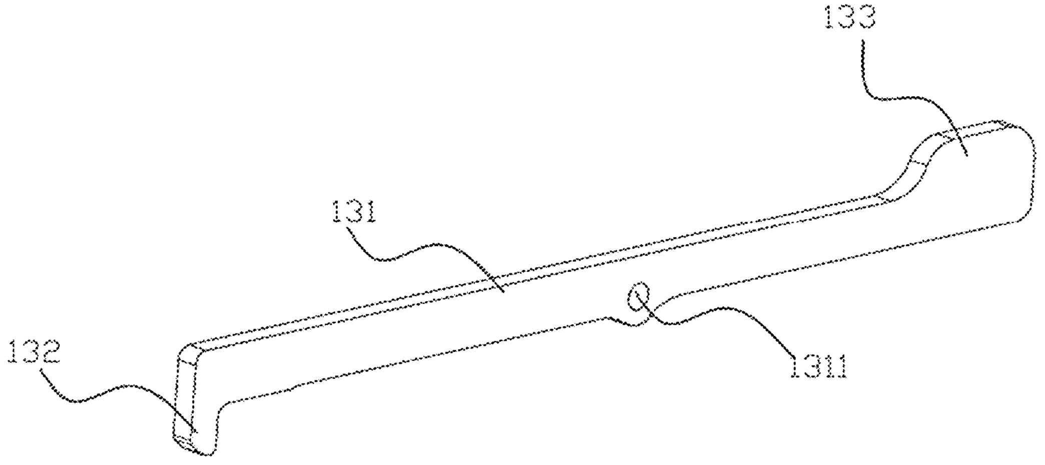
FIG. 6 is a schematic structural diagram of a pressing rod shown in FIG. 3.

Referring to FIG. 3 and FIG. 5, specifically, two opposite ends of the first clamping plier body 121 are provided with a first mounting head 1211 and a first dismounting head 1212, respectively; and two opposite ends of the second clamping plier body 122 are provided with a second mounting head 1221 and a second dismounting head 1222, respectively. The second mounting head 1221 and the first mounting head 1211 are disposed opposite to each other, and a snap spring is clamped and mounted through cooperation of the first mounting head and the second mounting head. The second dismounting head 1222 and the first dismounting head 1212 are disposed opposite to each other, and the snap spring is clamped and detached through cooperation of the second dismounting head and the first dismounting head. A clamping groove 124 is formed in a side edge, corresponding to the pressing rod 13, of each of the first clamping plier body 121 and the second clamping plier body 122, respectively. One end of the pressing rod 13 is disposed in the clamping groove 124 in a press fit manner, thereby transmitting the biasing force provided by the clastic member 14 to the pressing rod 13 to the first clamping plier body 121 or the second clamping plier body 122. Second through holes 125 are formed in the first clamping plier body 121 and the second clamping plier body 122 in a penetrating manner, respectively, and the first clamping plier body 121 and the second clamping plier body 122 are movably disposed on the connecting mechanism 123 through corresponding second through holes 125.

Referring to FIG. 5, specifically, the connecting mechanism 123 includes two connecting plates 1231 and a plurality of connecting pins 1232; the two connecting plates 1231 are oppositely disposed at an interval, and the first clamping plier body 121 and the second clamping plier body 122 are oppositely disposed between the two connecting plates 1231. The plurality of connecting pins 1232 are disposed on the two connecting plates 1231 in a penetrating manner, respectively. The first clamping plier body 121 and the second clamping plier body 122 are rotatably disposed on corresponding connecting pins 1232, respectively, and can perform biased movement relative to the connecting pins 1232 under action of the pressing rod 13. Specifically, the plurality of connecting pins 1232 are disposed on the two connecting plates 1231 in a riveting manner, respectively.

Referring to FIG. 1, FIG. 2, FIG. 3, and FIG. 6, in this embodiment, the pressing rod 13 includes a pressing rod main body 131, a compacting head 132, and a pressing head 133. The pressing rod main body 131 is a streamlined rod body and is movably disposed in the mounting groove 112 through the plug pin 15. The compacting head 132 and the pressing head 133 are disposed on two opposite ends of the pressing rod main body 131, respectively, and the compacting head 132 is detachably disposed in the clamping groove 124, thereby conveniently transmitting the biasing force provided by the clastic member 14 to the pressing rod 13 to the first clamping plier body 121 or the second clamping plier body 122. The height of the pressing head 133 is greater than that of a horizontal plane of the mounting groove 112, so that the pressing head 133 can be conveniently pressed. The elastic member 14 is disposed below the pressing head 133. Specifically, the pressing rod main body 131, the compacting head 132, and the pressing head 133 are integrally formed.

It should be noted that the snap spring dismounting and mounting tool provided by the present invention has the following specific working process: when the snap spring needs to be mounted, the mounting head on the dismounting and mounting assembly 12 is disposed on the outer side of the outer housing 11, an external force acts on the pressing head 133, and the pressing rod main body 131 transmits the force to make the compacting head 132 disengage from a clamping connection with the clamping groove 124 that is disposed on the second clamping plier body 122; and meanwhile, the elastic member 14 is compressed, so that the first mounting head 1211 and the second mounting head 1212 can perform biased movement relative to each other, thereby matching the size of the snap spring. When the external force disappears, under the restoring force of the elastic member 14, the compacting head 132 and the clamping groove 124 that is disposed on the second clamping plier body 122 are subjected to clamping connection again; the biasing force provided by the elastic member 14 to the pressing rod 13 is transmitted to the second clamping plier body 122, so that the second clamping plier body 122 performs biased movement towards the first clamping plier body 121 to clamp the snap spring that is disposed on the first mounting head 1211 and the second mounting head 1212, and thus the mounting operation of the snap spring can be completed.

When the snap spring needs to be dismounted, the dismounting head on the dismounting and mounting assembly 12 is disposed on the outer side of the outer housing 11, the external force acts on the pressing head 133, and the pressing rod main body 131 transmits the force to make the compacting head 132 disengage from the clamping connection with the clamping groove 124 that is disposed on the first clamping plier body 121; and meanwhile, the elastic member 14 is compressed, so that the first dismounting head 1212 and the second dismounting head 1222 can perform biased movement relative to each other, thereby matching the size of the snap spring. When the external force disappears, under the restoring force of the elastic member 14, the compacting head 132 and the clamping groove 124 that is disposed on the first clamping plier body 121 are subjected to clamping connection again; the biasing force provided by the elastic member 14 to the pressing rod 13 is transmitted to the first clamping plier body 121, so that the first clamping plier body 121 performs biased movement relative to the second clamping plier body 122, to clamp the snap spring that is disposed on the first dismounting head 1212 and the second dismounting head 1222, and thus the dismounting operation of the snap spring can be completed.

The technical features of the above embodiments can be combined in any way. To simplify the description, not all possible combinations of the technical features in the embodiments are described. However, as long as there is no contradiction in the combinations of these technical features, all possible combinations should be considered to fall within the scope of the specification.

The above embodiments only represent several implementation manners of the present invention, and the description thereof is relatively specific and detailed but should not be construed as limiting the scope of the present invention. It should be noted that for those of ordinary skill in the art, several modifications and improvements can be made without departing from the concept of the present invention and these modifications and improvements should all fall within the protection scope of the present invention. Therefore, the protection scope of the present invention shall be subject to the appended claims.

What is claimed is:

1. A snap spring dismounting and mounting tool, comprising:

an outer housing, which is a hollow cavity;

a dismounting and mounting assembly, two ends of which can be detachably clamped in the outer housing, respectively;

a pressing rod, which is movably disposed on the outer housing and can be in contact connection with or disengaged from, the dismounting and mounting assembly; and an elastic member, which is disposed in the outer housing, is in contact connection with the pressing rod, and provides a biasing force and a restoring force to the pressing rod, respectively, wherein the dismounting and mounting assembly comprises a connecting mechanism, and a first clamping plier body and a second clamping plier body that are movably disposed on the connecting mechanism relative to each other; the first clamping plier body and the second clamping plier body have a gap disposed therebetween, and can be in contact connection with or disengaged from the pressing rod, respectively; and when the pressing rod is in contact connection with the first clamping plier body or the second clamping plier body, the pressing rod provides a biasing force to the first clamping plier body or the second clamping plier body, allowing the first clamping plier body and the second clamping plier body to perform biased movement relative to each other.

2. The snap spring dismounting and mounting tool according to claim 1, wherein two opposite ends of the first clamping plier body are provided with a first mounting head and a first dismounting head, respectively; two opposite ends of the second clamping plier body are provided with a second mounting head and a second dismounting head, respectively; the first mounting head and the second mounting head are disposed opposite to each other, and a snap spring is clamped and mounted through cooperation of the first mounting head and the second mounting head; and the first dismounting head and the second dismounting head are disposed opposite to each other, and the snap spring is clamped and detached through cooperation of the first dismounting head and the second dismounting head.

3. The snap spring dismounting and mounting tool according to claim 2, wherein two limiting grooves are symmetrically disposed in the outer housing, and the two ends of the dismounting and mounting assembly are detachably disposed in corresponding limiting grooves, respectively.

4. The snap spring dismounting and mounting tool according to claim 2, wherein a mounting groove is disposed on a side edge of the outer housing, and the pressing rod is rotatably disposed in the mounting groove by means of a plug pin.

5. The snap spring dismounting and mounting tool according to claim 4, wherein a first through hole is further formed in the outer housing in a penetrating manner, and the plug pin is disposed on the outer housing through the first through hole.

6. The snap spring dismounting and mounting tool according to claim 4, wherein a clamping groove is formed in a side edge, corresponding to the pressing rod, of each of the first clamping plier body and the second clamping plier body, respectively, and one end of the pressing rod is disposed in the clamping groove in a press fit manner.

7. The snap spring dismounting and mounting tool according to claim 6, wherein the pressing rod comprises a pressing rod main body which is a streamlined rod body and is movably disposed in the mounting groove through the plug pin; and a compacting head and a pressing head which are disposed on two opposite ends of the pressing rod main body, respectively, wherein the compacting head is detachably disposed in the clamping groove.

8. The snap spring dismounting and mounting tool according to claim 7, wherein a height of the pressing head is greater than that of a horizontal plane of the mounting groove, and the elastic member is disposed below the pressing head.

9. The snap spring dismounting and mounting tool according to claim 7, wherein the pressing rod main body, the compacting head, and the pressing head are integrally formed.

10. The snap spring dismounting and mounting tool according to claim 2, wherein second through holes are formed in the first clamping plier body and the second clamping plier body in a penetrating manner, respectively, and the first clamping plier body and the second clamping plier body are movably disposed on the connecting mechanism through corresponding second through holes.

11. The snap spring dismounting and mounting tool according to claim 2, wherein the connecting mechanism comprises: two connecting plates oppositely disposed at an interval, the first clamping plier body and the second clamping plier body being oppositely disposed between the two connecting plates; and a plurality of connecting pins disposed on the two connecting plates in a penetrating manner, respectively, and the first clamping plier body and the second clamping plier body being rotatably disposed on corresponding connecting pins, respectively.

12. The snap spring dismounting and mounting tool according to claim 11, wherein the plurality of connecting pins are disposed on the two connecting plates in a riveting manner, respectively.

13. The snap spring dismounting and mounting tool according to claim 1, wherein a spring is used as the elastic member.

14. The snap spring dismounting and mounting tool according to claim 1, wherein a connecting hole is formed in the outer housing in a penetrating manner.

* * * * *